United States Patent [19]

Tomlin et al.

[11] Patent Number: 4,887,643
[45] Date of Patent: Dec. 19, 1989

[54] PILOT ACTUATED SPOOL VALVE

[75] Inventors: Jerry B. Tomlin, Sugar Land; Ingo W. V. Olejak, Houston, both of Tex.

[73] Assignee: Koomey, Inc., Houston, Tex.

[21] Appl. No.: 353,272

[22] Filed: Mar. 1, 1982

[51] Int. Cl.[4] .......................................... F15B 13/042
[52] U.S. Cl. ........................... 137/625.66; 137/236.1; 137/625.27; 137/625.68; 137/798
[58] Field of Search ........... 137/236.1, 596.18, 625.27, 137/625.48, 625.66, 625.68, 798; 166/341, 344, 363; 251/50, 52, 63.6; 285/9, 25, 28, 108, 295, 302, 347

[56] References Cited

U.S. PATENT DOCUMENTS

| | | | |
|---|---|---|---|
| 2,931,615 | 4/1960 | Campbell | 251/50 |
| 3,572,032 | 3/1971 | Terry | 60/478 X |
| 3,701,549 | 10/1972 | Koomey et al. | 285/24 |
| 3,774,638 | 11/1973 | Kriett | 137/625.48 |
| 3,817,281 | 6/1974 | Lewis et al. | 137/594 |
| 3,921,660 | 11/1975 | Kowalski | 137/236 |
| 3,957,079 | 5/1976 | Whiteman | 137/596.18 |
| 3,966,235 | 6/1976 | Lewis | 285/25 |
| 4,011,892 | 3/1977 | Kowalski | 137/625.66 |
| 4,098,295 | 7/1978 | Haytayan | 137/625.27 |
| 4,166,475 | 9/1979 | Gano | 137/614.03 X |
| 4,311,297 | 1/1982 | Barrington | 166/363 X |
| 4,404,989 | 9/1983 | Le Moine | 137/798 X |

OTHER PUBLICATIONS

Page 142-1980-1981 General Catalog, Koomey, Inc.

Primary Examiner—Gerald A. Michalsky
Attorney, Agent, or Firm—Fulbright & Jaworski

[57] ABSTRACT

A housing has a cage with supply fluid ports, vent ports and an outlet port. A pilot actuated hollow spool valve element is telescopically movable in the cage and engages poppet seats at opposite ends of the cage. Elongated supply and vent slots directed transversely to the axis of the cage and valve element provide maximum flow passages. The ends of the spool are in contact with the cage at all times and the axial extent of the contact between the spool and the cage is greater than fifty percent. The spool engages the interior of the cage at the fluid ports and vent ports for reducing flow restrictions. A recess coaxially positioned at each end of the cage receives one of the valve seats. The housing abuts the cage for properly loading the valve seats. A dash pot cushions the valve element. A pilot control stem is connected to the valve element exteriorly of the valve element. A seal carrier provides a seal between mating surfaces of an underwater control pod.

4 Claims, 5 Drawing Sheets

PILOT ACTUATED SPOOL VALVE

BACKGROUND OF THE INVENTION

It is well known to provide a three port, two position spool valve movable in a cage for supplying and exhausting fluid to and from an outlet port as shown in U.S. Pat. Nos. 3,921,660 and 4,011,892, and as illustrated on page 142 in the 1980-1981 General Catalog of Koomey, Inc. Such valves are useful in subsea pods for controlling blowout preventors such as shown in U.S. Pat. Nos. 3,957,079 and 3,817,281.

The present invention is directed to various improvements in such a valve by having (1) a spool valve element which is more fully guided, (2) a cage having a reduction in fluid chambers for reducing flow restrictions, (3) a cage having transversely slotted flow passages for providing full flow passages with a minimum of spool travel, (4) a dash pot between the spool and the cage for cushioning the operation of the spool, (5) a valve structure which provides a metal-to-metal stackup of the valve assembly for correctly loading of the valve seats, (6) a structure which allows the preassembly of the complete valve before installation, (7) a structure which has only one seal which is required to pass an intersecting bore in a valve pocket for decreasing the chances of cutting the seal, (8) a control stem to spool connection that is external to the spool for easier connection, (9) a split ring retainer between a spring plate and the valve stem that is locked into a captive groove, (10) a pilot seal chamber which is filled with a protective fluid pressure compensated from the surrounding environment by a flexible membrane and includes a relief vent, and (11) a pod seal carrier, either of a compression type or a pressure energized type, for use in place of conventional pod seals.

SUMMARY

The present invention is directed to a pilot control valve having a housing and a generally tubular shaped cage having supply fluid ports, vent ports, and an outlet port with a pilot actuated hollow spool valve element telescopically movable in the cage and poppet valve seats at opposite ends of the cage for engagement by the valve element. The fluid ports and the vent ports are elongated slots directed transversely to the axis of the cage and valve element for providing maximum flow passages with a minimum of spool travel. The spool is more fully guided in the cage by having the opposite ends of the spool being in contact with the cage at all times and having the axial extent of contact between the spool and the cage being greater than fifty percent at all positions of the spool relative to the cage. In addition, the spool engages the interior of the cage at the location of the supply fluid ports and vent ports for reducing flow restrictions.

Yet a further object of the present invention is the provision of a dash pot positioned between the valve element and the cage for cushioning the valve element as it operates.

Still a further object of the present invention is wherein the cage is of metal and includes a recess coaxially positioned at each end of the cage for receiving one of the valve seats whereby the valve seats are enclosed about their sides for securely supporting the seats to allow them to be suitable for bi-directional flow service.

Still a further object of the present invention is wherein the metal valve housing abuts one end of the metal cage and includes exterior threads for securing the valve into a valve receiving pocket to provide a metal-to-metal stackup of the valve assembly within the pocket whereby threadably securing the valve into the receiving pocket will properly load the valve seats.

A further object of the present invention is wherein the valve includes a pilot control stem with a threaded bolt connected to the valve element and extending exteriorly of the element and into the stem with a pin extending through the bolt and the stem exteriorly of the valve element for providing easy connection and disconnection of the stem to the valve element.

Yet a further object of the present invention is the provision of a spring plate having a recess and positioned in the housing and in which the pilot control stem has a groove in which a split ring is connected to the groove in the stem and is positioned in the recess in the spring plate for providing a connection that will not disconnect under shock load conditions.

Yet a still further object of the present invention is the provision of a housing which is sealed and pressure compensated from the surrounding environment by means of a flexible membrane and in which the interior is filled with a protective fluid and is connected to a relief vent for protecting the housing interior from a corrosive environment.

Still a further object is the provision of a seal carrier connected to the bottom of the valve for providing a seal between mating surfaces of an underwater control pod. One embodiment is a compression type seal and another embodiment is a pressure energized seal. These seals may be replaced with the valve. These seals provide a more blowout proof structure.

Other and further objects, features and advantages will be apparent from the following description of presently preferred embodiments of the invention given for the purpose of disclosure and taken on conjunction with the accompanying drawings.

DESCRIPTION OF THE PREFERRED EMBODIMENT

Figure 1:
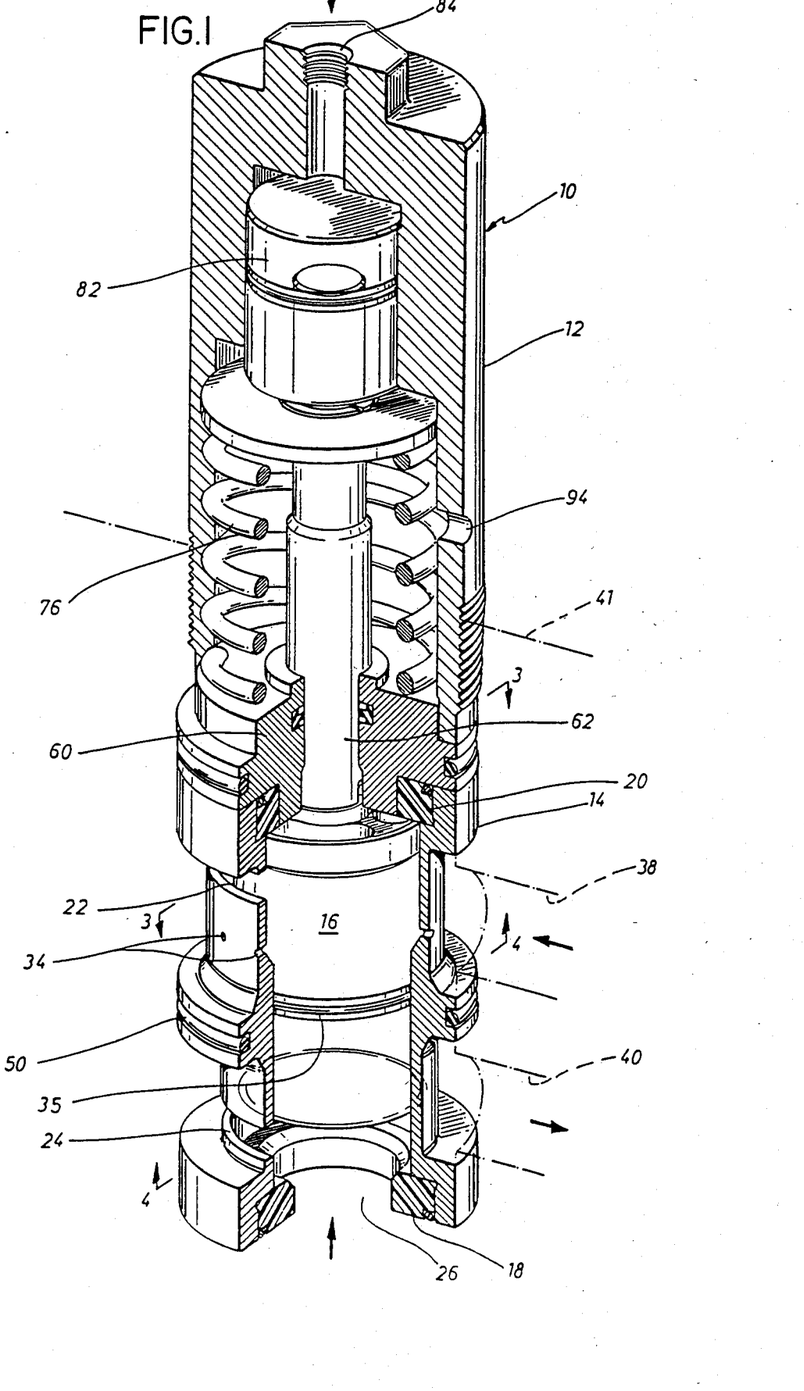
FIG. 1 is an elevational perspective view, partly in cross section, of the valve of the present invention shown in the vent position.
Figure 2:
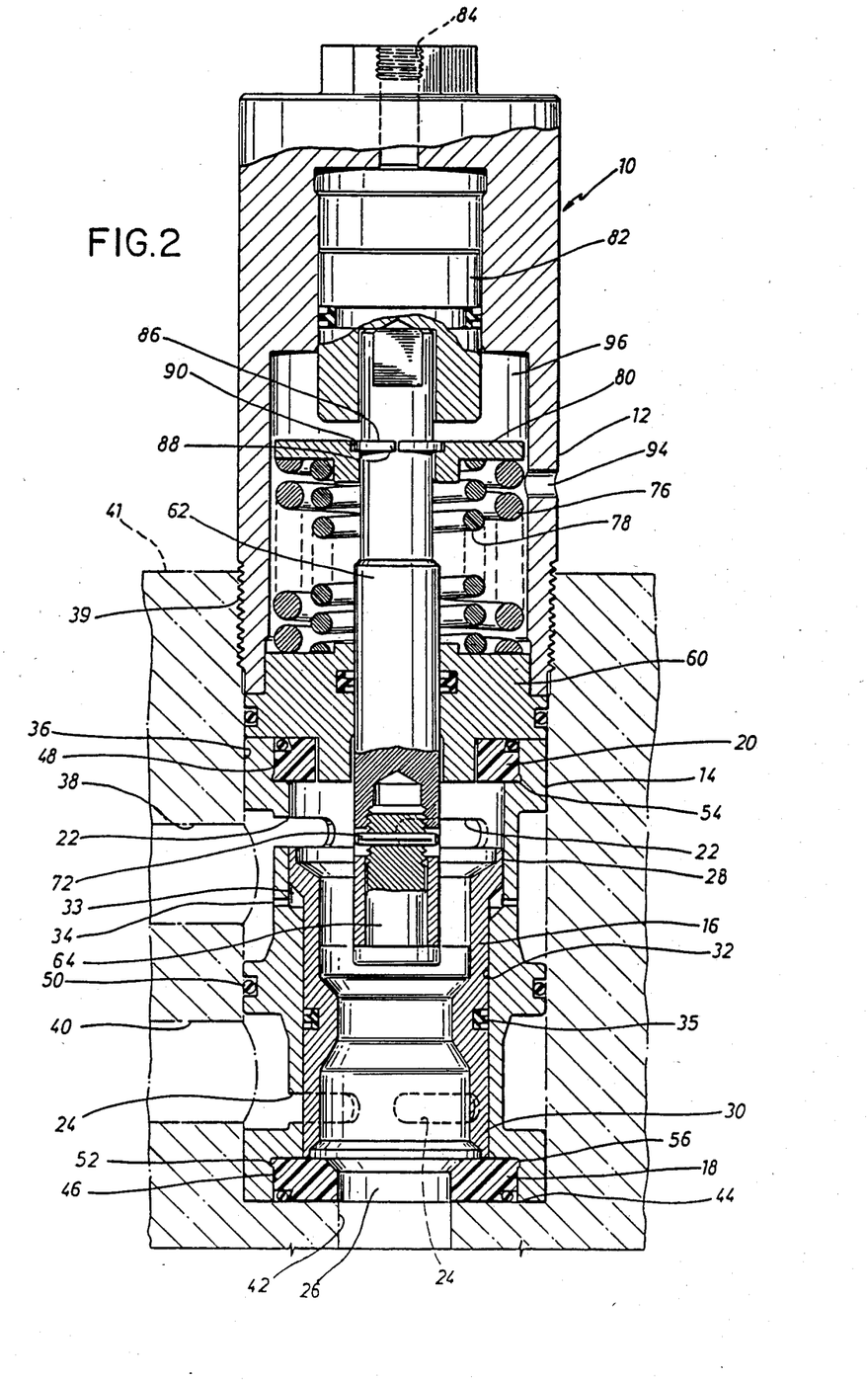
FIG. 2 is an elevational view, in cross section of the valve of the present invention shown in the open position.
Figure 3:
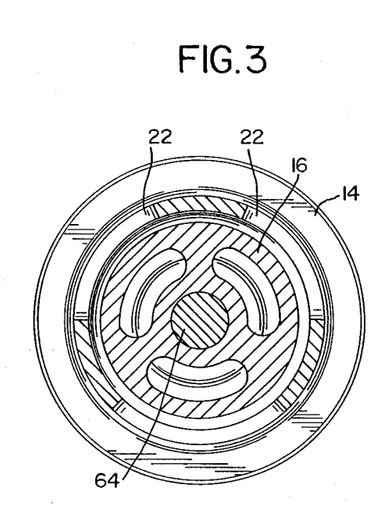
FIG. 3 is a cross-sectional view taken along the line 3—3 of FIG. 1.

Referring now to the drawings and particularly to FIGS. 1 and 2, the reference numeral 10 generally indicates the valve of the present invention which is particularly adapted for controlling the supply of hydraulic fulid from and to underwater equipment such as blowout preventors such as disclosed in U.S. Pat. No. 3,957,079. The valve 10 includes a control housing 12, a generally tubular shaped cage 14, a pilot actuated hollow spool valve element 16 which is telescopically movable in the cage 14 and poppet valve seats 18 and 20 at opposite ends of the cage 14 for engagement by the spool valve element 16.

The valve cage 14 includes a plurality of supply fluid inlet ports 22, a plurality of vent ports 24 and an outlet port 26. In FIG. 2 the spool valve element 16 is seated on valve seat 18 thereby opening the supply ports 22 to allow hydraulic fluid to flow through the ports 22 and through the interior of the hollow spool valve element 16 and out the outlet port 26. In FIG. 1 the valve element 16 is in the upward position seated on valve seat 20 closing the supply ports 22 and opening the vent ports 24 to allow fluid to flow from the outlet port 26 and vent through the vent ports 24.

It is to be particularly noted that the ports 22 and 24 are elongated slots directed transversely to the axis of the cage 14 and the valve element 16 and provide large flow passages with a minimum of travel of the spool 16. It is also noted that the ends of the spool 16 engage the interior of the cage 14 at the location of the supply ports 22 and vent ports 24 for reducing flow restriction. The prior art valves utilize a cage with round supply and vent holes which do not uncover as much of a flow passage area with the minimum of spool travel as the present invention. The prior art in order to increase the flow area provided inner annular chambers between the cage 14 and the spool 16 to increase the communication with the round holes, but this required the fluid flow to pass from one chamber into another chamber with a resultant restriction in flow of the fluid. The present valve has a single chamber on the exterior of the cage 14 and when the supply ports 22 or the vent ports 24 are uncovered by the spool 16 the fluid flow will pass directly between the interior of the spool valve element 16 and the ports 22 and 24 without encountering other restrictions and therefore the present valve provides a higher flow capacity.

It is further noted that the ends 28 and 30 of the spool 16 are in telescopic contact with the interior of the cage 14 at all times for providing a more secure arrangement for guiding the moving spool 16 in the cage 14. Furthermore, it is noted that the interior wall section 32 of the cage 14 encloses a majority of the axial extent of the spool 16 throughout its stroke to again provide a more firmly supported and guided structure. When the valve is in the open position as best seen in FIG. 2, the spool 16 is very nearly guided along its entire length, and even in the vented position of FIG. 1 the axial extent of contact between the spool 16 and the cage 14 is greater than fifty percent. This increased spool support provides an advantage over prior art type valves in which the valve element is only partially supported and in which the ends of the valve element must enter and leave bores in which spool misalignment will result in damage to the valve.

Seal means such as seal 35 is provided between the cage 14 and the spool 16, preferably on the spool 16 for preventing fluid flow between the supply ports 22 and the vent port 24.

Referring now to FIG. 1, a dash pot is provided between the cage 14 and the spool 16 for cushioning the operation of the spool 16 as it reciprocates to reduce the hammer blow action of the spool 16 against the valve seat 18 and 20. Thus, a chamber 33 is provided between the cage 14 and the spool 16 with a plurality of ports 34 extending through the cage 14 which restricts the flow of fluid into and out of the chamber 33 as the spool 16 moves.

Figures 4, 5, 7A:
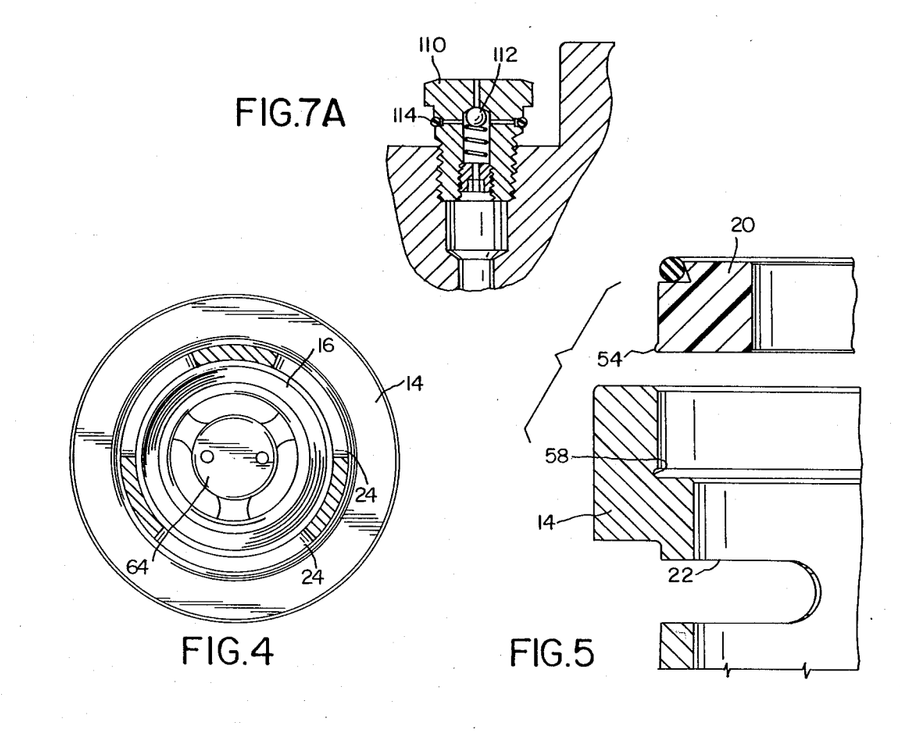
FIG. 4 is a cross-sectional view taken along the line 4—4 of FIG. 1.
FIG. 5 is an enlarged fragmentary exploded cross-sectional view of the inter-relationship between one of the valve seats and the valve cage.
FIG. 7A is an enlarged fragmentary view in cross section of the relief vent valve shown in FIG. 7.

Referring now to FIGS. 1 and 2, the valve 10 is adapted to be secured in a valve pocket 36 by means of a threaded connection 39 between the valve pocket housing 41 and the valve housing 12. The housing 41 includes a fluid supply port 38, a fluid vent port 40 and a fluid outlet port 42. The valve pocket 36 includes a seat 44 against which the valve 10 seats. Referring now to FIGS. 1, 2 and 5, the cage 14 includes recesses 46 and 48 at each end for receiving the valve seats 18 and 20, respectively. Thus the seats 18 and 20 are enclosed about their outer sides and when inserted into the valve pocket 36 do not encounter the bores of the ports 38 and 40. Only the seal 50 on the outer periphery of the cage 14 is forced to pass the intersecting bore 38 when installing the valve 10 in the pocket 36 and is the only seal subject to the possibility of being cut as it passes the intersecting bore 38 which could cause leak problems when the valve 10 is placed in service. Preferably, each of the seats 18 and 20 includes a ridge 52 and 54, respectively, which coacts with a groove 56 and 58, respectively, for retaining the seats in place in the cage 14. Thus unlike prior art valves the valve 10 may be preassembled including all of its seals and installed complete into the pocket 36 to assure accurate alignment of the parts. Furthermore, the cage structure 14 permits a metal-to-metal stackup of the valve 10 within the pocket 36. This permits proper installation torque to be applied across the valve 10 as it is threadably inserted by the threads 39 into the pocket 36 without putting either excessive or insufficient loads on the plastic seats 18 and 20. Excessive loading of the plastic seats 18 and 20 may cause distortion at the face of the seal and result in a leaking valve. Insufficient loading will allow the seats 18 and 20 to be loose and fail to seal and allows misalignment between mating parts and possible valve failure. Insufficient loading may allow the valve to loosen and back out of the pocket due to vibration within the system. The metal-to-metal stackup is achieved since the housing 12 is of metal and in turn abuts the seal retainer 60 which is metal which in turn contacts the upper end of the cage 14 and the lower end of the cage 14 engages the seat 44 in the valve housing 41. Thus the threadable insertion of the valve 10 and its seating against the seat 44 is through a metal-to-metal contact and not directly through the valve seats 18 and 20.

Furthermore, positioning the valve seats 18 and 20 into the recesses 46 and 48 more fully supports the seats 18 and 20 and allows them to be suitable for bi-directional flow service and supports the tops and sides of the seats 18 and 20 to minimize differential areas that could unduly load the seals during pressure reversal conditions.

Figure 6:
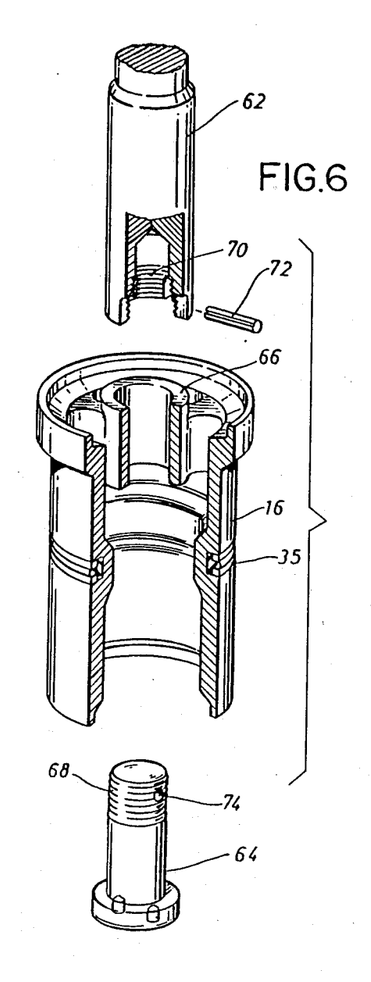
FIG. 6 is an enlarged exploded fragmentary view in perspective and partial cross section illustrating the connection between the valve stem and the valve spool.

The stem to spool connection is best seen in FIGS. 2 and 6 in which the pilot operated valve stem 62 is connected to the spool valve element 16. Prior art designs require the stem 62 to be connected to the spool 16 by a connection inside of the spool 16 which was difficult to assemble and disassemble. In the present valve a threaded bolt 64 is connected through a support 66 and threaded into the stem 62 by coacting threads 68 and 70. A pin 72 extends through both the bolt 64 and the stem 62 through an opening 74 which is exterior of the spool valve element 16 and its ends are slightly flared to prevent its disconnection.

Figure 7:
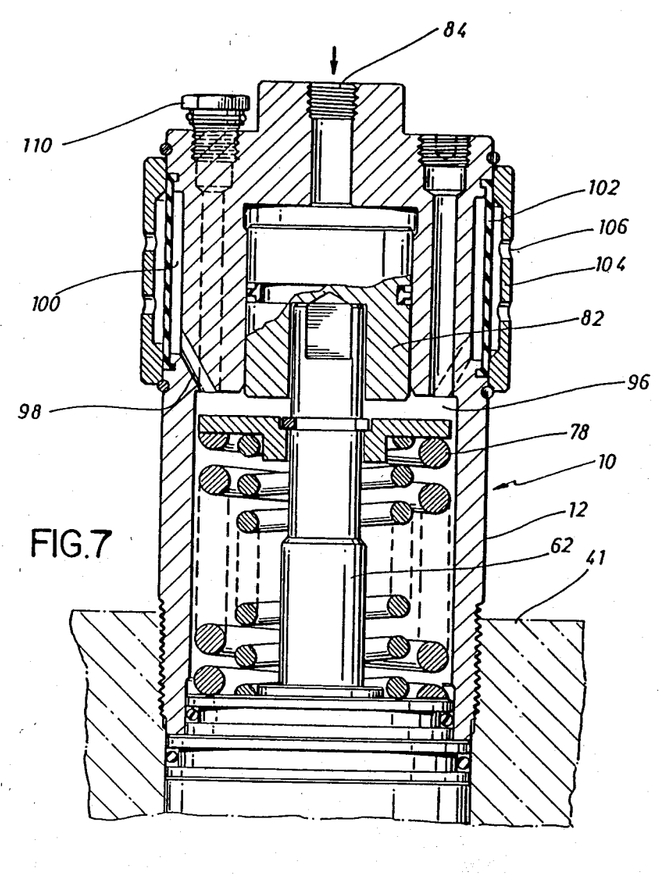
FIG. 7 is an enlarged fragmentary elevational view, in cross section, of the valve of the present invention with a protective flexible membrane attached to the housing.

As best seen in FIGS. 2 and 7, the pilot control stem 62 extends into the housing 12 and is urged into a vent position by one or more springs 76 and 78 acting between the seal element 60 and a spring plate 80. The stem 62 is also actuated by a pilot controlled piston 82 which is subjected to fluid pressure from a pilot port 84 in the housing 12. In prior art valves, difficulty has been encountered in securing the spring plate 80 to the stem 62. The present invention provides a split ring 86 which is inserted in a groove 88 in the stem 62 and secured therein by a recess 90 in the spring plate 80 which holds the ring 86 captive in the recess 90 and groove 88. The ring 86 provides a suitable bearing and shear area for holding the spring plate 80 and will not roll out of the groove 88 under shock load conditions which has occurred using conventional retainer rings.

Referring to FIGS. 1 and 2, an opening 94 or plurality of openings is provided in the housing 12 to accommodate fluid displacement in the interior 96 of the housing 12 as the piston 82 and stem 62 are moved. However, as the valve 10 is designed for underwater use, corrosive seawater enters the opening 94 and corrodes the inside of the housing 12. Referring now to FIG. 7, a fully enclosed and sealed enclosure may be provided for the housing 12 for protecting the interior 96 against corrosive environment. An opening 98 is in communication with the interior 96 of the housing 12 and extends to an annular chamber 100 which is sealed by a flexible membrane 102 which in turn is protected by a shield 104 having openings 106. The interior 96 of the housing 12 is filled with any suitable protective fluid. The membrane 102 flexes with volumetric changes due to temperature changes and fluid displacement occuring from the valve operation. The membrane 102 excludes seawater from entering the valve interior and minimizes corrosion of the working parts. If desired, a relief valve 110, as best seen in FIGS. 7 and 7A, may be provided in communication with the cavity 96 which includes a spring loaded check valve 112 for filling the cavity 96 but also includes a relief seal 114 such as an O-ring which may expand to allow the protective fluid to escape in the event of overfilling, temperature changes or fluid leakage.

Figures 8, 9:
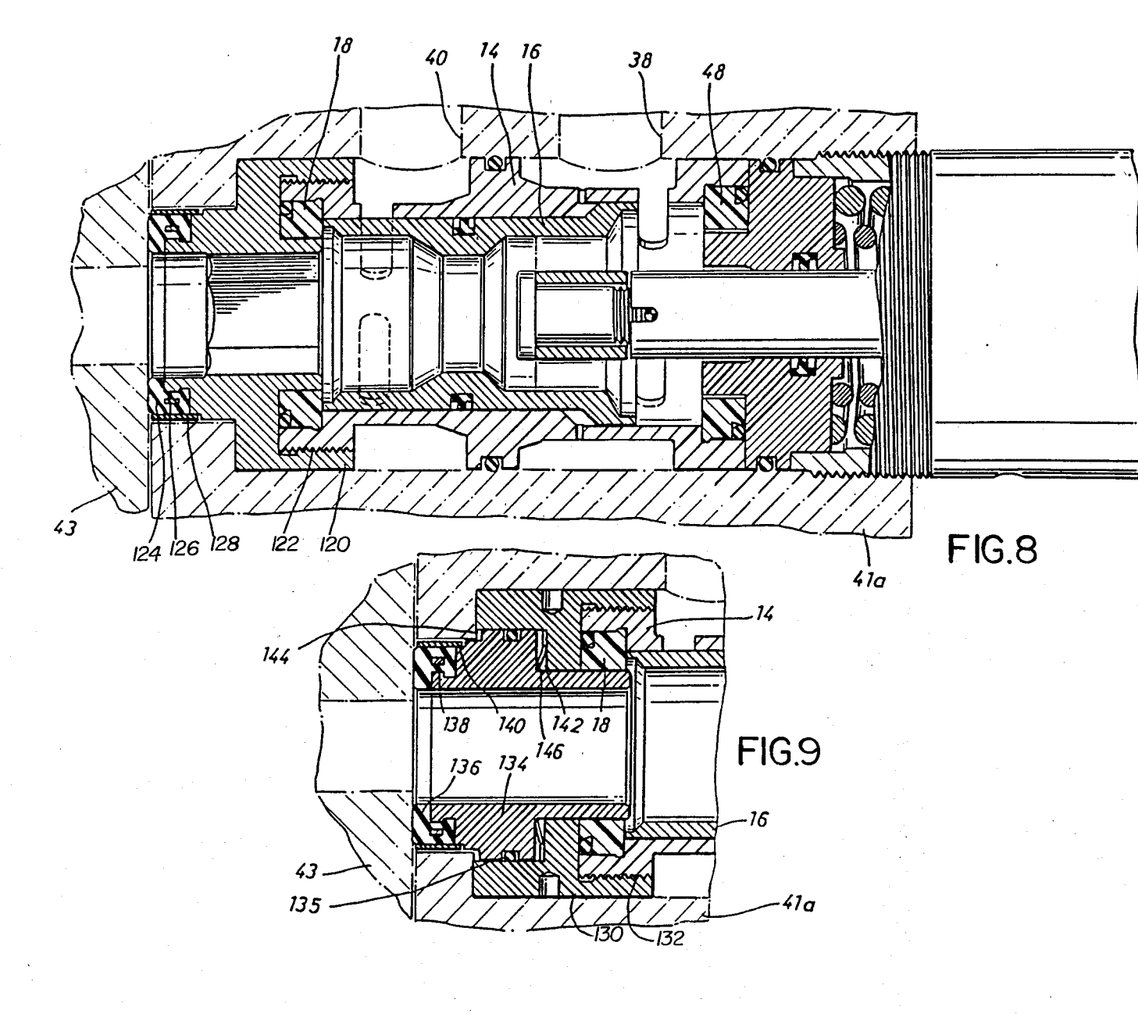
FIG. 8 is a fragmentary elevational view in cross section of the valve of the present invention including a compression type seal carrier attached to the valve.
FIG. 9 is a fragmentary elevational view in cross section of the valve of the present invention including a pressure energized type seal carrier attached to the valve.

Referring now to FIGS. 8 and 9, two embodiments of a seal carrier are shown which may be connected to the valve of the present invention for providing the seal between mating underwater pod connectors. That is, the valve housing 41a may be adapted to mate with and seal with a coacting housing 43 for supplying hydraulic fluid and venting fluid from underwater equipment such as generally disclosed in U.S. Pat. No. 3,817,281. This generally requires a seal on the retrievable member such as housing 41a. The seal carrier attachment of the present invention provides a seal on the valve 10 which seals between the members 41a and 43 and replaces the conventional seal connected to retrievable member 41a.

The carrier seal has the advantages of (1) being changeable while the members 41a and 43 are connected, (2) provides a smoother flow path from seal interface to the valve, and (3) provides a seal with a better blowout proof structure.

Referring not to FIG. 8, a compression type seal to provided in which a seal carrier 120 is threadably connected to the valve cage 14 by threads 122 and supports and encloses valve seat 18. A compression seal 124 is connected such as by bonding to the lower end of the carrier 120 to engage with and seal with the member 43 when the member 41a is connected thereto. The seal 124 preferably includes an integral internal reinforcement 126 and an anti-extrusion backup ring 128. This structure reduces manufacturing cost of the member 41a as it no longer requires a seal surface 44. Also, the seal 124 permits the outside diameter of the seal 124 to be less than the outside diameter of conventional seals on member 41a sealing against member 43 which reduces the separating force that pod latch connector means between 41a and 43 must resist to maintain a tight seal.

Referring now to FIG. 9, a pressure energized type seal is shown in which a seal carrier 130 is threadably connected to the cage 14 by threads 132 and includes a telescopically movable insert 134 which carries the seal 136. The seal 136 may include an integral internal reinforcement 138 and an anti-extrusion backup ring 140. The insert 134 is retained in position between a shoulder 142 on the carrier 130 and a shoulder 144 on the member 41a. A spring 146 urges the seal 136 into initial sealing engagement with the member 43. The combination of the shoulders 142 and 144 limits the compression of seal 136 under differential pressure loads so that the seal 136 is not overstressed, and limits the travel of the seal 136 during separation of the member 141 from the member 143 while under pressure. In addition, pressure acting on an energizing seal 135 provides a greater force to energize the seal 136 since this force acts across a greater area than the seal 136.

Other prior art conventional seals such as disclosed in U.S. Pat. No. 3,701,549 uses external protruding retainers to hold the pod seal in the pocket while the present designs are retained by the valve 10 and provide a cleaner, flatter interface surface. The present design provides a smooth bore flow path from the seal 136 to the valve 10 and do not create turbulence in the flow stream.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts, will readily suggest themselves to those skilled in the art and which are encompassed within the spirit of the invention and the scope of the appended claims.

What is claimed is:

1. In a pilot controlled valve having a housing and a generally tubular shaped cage having supply fluid ports, vent ports, and an outlet port, a pilot actuated hollow spool valve element telescopically movable in the cage, poppet valve seats at opposite ends of the cage for engagement by the valve element, the improvement comprising, said fluid ports and vent ports being elongated slots directed transversely to the axis of the cage and valve element for providing maximum flow passages with a minimum of spool travel, the outer circumference of the terminal ends of the spool being in at least partial contact with the cage at all times, and the axial extent of contact between the spool and the cage being greater than fifty percent at all positions, said spool engaging the interior of the cage at the location of the supply fluid ports and vent ports for reducing flow restrictions, and a dash pot chamber positioned between the valve element and the cage and a port extending from said chamber through the cage for cushioning the valve element as it moves in a direction to uncover the supply fluid ports.

2. In a pilot controlled valve having a housing and a generally tubular shaped cage having supply fluid ports, vent ports, and an outlet port, a pilot actuated hollow spool valve element telescopically movable in the cage, poppet valve seats at opposite ends of the cage for engagement by the valve element, the improvement comprising, said fluid ports and vent ports being elongated slots directed transversely to the axis of the cage and valve element for providing maximum flow passages with a minimum of spool travel, the outer circumference of the terminal ends of the spool being in at least partial contact with the cage at all times, and the axial extent of contact between the spool and the cage being greater than fifty percent at all positions, said spool engaging the interior of the cage at the location of the supply fluid ports and vent ports for reducing flow restrictions, said valve including a pilot controlled stem, a threaded bolt connected to the valve element and extending exteriorly of the element and threaded into the stem, and a pin extending through the bolt and said stem exteriorly of the valve element.

3. In a pilot controlled valve having a housing and a generally tubular shaped cage having supply fluid ports, vent ports, and an outlet port, a pilot actuated hollow spool valve element telescopically movable in the cage, poppet valve seats at opposite ends of the cage for engagement by the valve element, the improvement comprising, said fluid ports and vent ports being elongated slots directed transversely to the axis of the cage and valve element for providing maximum flow passages with a minimum of spool travel, the outer circumference of the terminal ends of the spool being in at least partial contact with the cage at all times, and the axial extent of contact between the spool and the cage being greater than fifty percent at all positions, said spool engaging the interior of the cage at the location of the supply fluid ports and vent ports for reducing flow restrictions, said cage being metal and including a recess coaxially positioned at each end of the cage for entirely receiving one of the valve seats whereby the seats are enclosed about their sides and are protected by the cage from being axially overloaded, and a metal valve housing abutting one end of the metal cage and including exterior threads for securing the valve into a valve receiving pocket whereby threadedly securing said valve into the receiving pocket with the other end of the metal cage engaging said pocket will provide a metal contact of said valve with the pocket to avoid loading of soda valve seats.

4. In a pilot controlled valve having a housing and a generally tubular shaped cage having supply fluid ports, vent ports, and an outlet port, a pilot actuated hollow spool valve element telescopically movable in the cage, poppet valve seats at opposite ends of the cage for engagement by the valve element, the improvement comprising, said fluid ports and vent ports being elongated slots directed transversely to the axis of the cage and valve element for providing maximum flow passages with a minimum of spool travel, the outer circumference of the terminal ends of the spool being in at least partial contact with the cage at all times, and the axial extent of contact between the spool and the cage being greater than fifty percent at all positions, said spool engaging the interior of the cage at the location of the supply fluid ports and vent ports for reducing flow restrictions, a seal carrier threadedly connected to the lower end of the cage, said carrier including a shoulder for engaging and supporting the lower valve seat, and a resilient seal protruding downwardly supported by the carrier.

* * * * *

UNITED STATES PATENT OFFICE
CERTIFICATE OF CORRECTION

Patent No. 4,887,643      Dated December 19, 1989

Inventor(s)   Jerry B. Tomlin

It is certified that error appears in the above-identified patent and that said Letters Patent is hereby corrected as shown below:

Column 6, line 6, delete the second occurrence of "to" and insert -- is --

Column 8, line 22, delete "soda" and insert -- said --

Signed and Sealed this

Sixth Day of August, 1991

Attest:

HARRY F. MANBECK, JR.

*Attesting Officer*      *Commissioner of Patents and Trademarks*